United States Patent
Taniguchi et al.

[11] 3,946,202
[45] Mar. 23, 1976

[54] INFORMATION WRITING DEVICE

[75] Inventors: Tadasu Taniguchi, Tokyo; Iwao Hosaka; Shigeru Yoshida, both of Chichibu, all of Japan

[73] Assignees: Canon Kabushiki Kaisha; Canon Denshi Kabushiki Kaisha, both of Tokyo, Japan

[22] Filed: Sept. 27, 1974

[21] Appl. No.: 509,850

[30] Foreign Application Priority Data
Sept. 29, 1973  Japan............................ 48-109854

[52] U.S. Cl.................... 235/61.7 B; 235/61.11 D
[51] Int. Cl.² ....................... G06K 5/00; G06K 7/08
[58] Field of Search .............. 235/61.11 D, 61.7 B; 340/149 A; 179/100.2 A, 100.2 B; 360/39

[56] References Cited
UNITED STATES PATENTS

| | | | |
|---|---|---|---|
| 3,706,860 | 12/1972 | Burbank | 235/61.11 D |
| 3,818,500 | 6/1974 | Lemelson | 235/61.11 D |
| 3,860,793 | 1/1975 | Roe et al. | 235/61.11 D |
| 3,866,827 | 2/1975 | Obata et al. | 235/61.11 D |

*Primary Examiner*—D. W. Cook
*Attorney, Agent, or Firm*—Fitzpatrick, Cella, Harper & Scinto

[57] ABSTRACT

An information writing device is used to write information on a card such as magnetic card. Information to be written on a card is manually fed into the device through a keyboard. The card may be reciprocated through a driving unit to write information thereon during its forward stroke and to read out the information during its backward stroke. The information read out is collated with the input one to visually indicate resulting coincidence or non-coincidence thereof.

18 Claims, 4 Drawing Figures

INFORMATION WRITING DEVICE

BACKGROUND OF THE INVENTION

1. Field of the Invention

This invention relates to an information writing device and more particularly to an information writing device having a novel construction that, on writing information on the card and after having written information, can instantly confirm and determine whether correct information is written or not.

2. Description of the Prior Art

Recording media, in general, include magnetic tapes, punched tapes, magnetic discs, punched cards and magnetic cards. Among them, information recording media of the card type find extensive applications such as deposite cards, credit cards, certificate cards, etc., and are expected to meet the trend toward labor-saving and not using cash. However, the aforementioned card type of information recording media, generally record information in the form of coded signals instead of characters or numerical figures that are used daily, and in addition, it is usually unable at a glance to know what contents are written owing to its necessity to keep the contents secret. Therefore, it is necessary to confirm whether the information is recorded correctly or not by reading out the recorded contents of the card by a card reader after information is written on the card. As for the magnetic card particularly, since the packing density of information is high, the presence of dust between the writing head and the magnetic card often invites the trouble of failure to write correct information, thus necessitating to confirm the contents by the card reader after the information is written on the card. This, however, prevents quick processing of information and also requires attendance of man power to process great deal of information, imposing a problem in view of labor-saving.

SUMMARY OF THE INVENTION

The object of this invention is to provide a novel setup to improve the aforementioned defects.

Another object of the invention is to provide an effective device for determining whether the information is written correctly or not by immediately reading the written information during the backward movement of the card and comparing the written information with the read information in the system of writing information on the card during forward movement of the card in which the card is to be moved reciprocally.

A further object of the invention is to provide a convenient device that can display the result visually, in which the information is written on the card, said information is memorized and the written information is read out without being destroyed and compared with said memorized contents.

Yet further objects of the invention will become clear from the following descriptions with reference to the accompanying drawings which deal with embodiments where the magnetic card is used as a recording medium.

DETAILED DESCRIPTION OF PREFERRED EMBODIMENT

Figure 1:
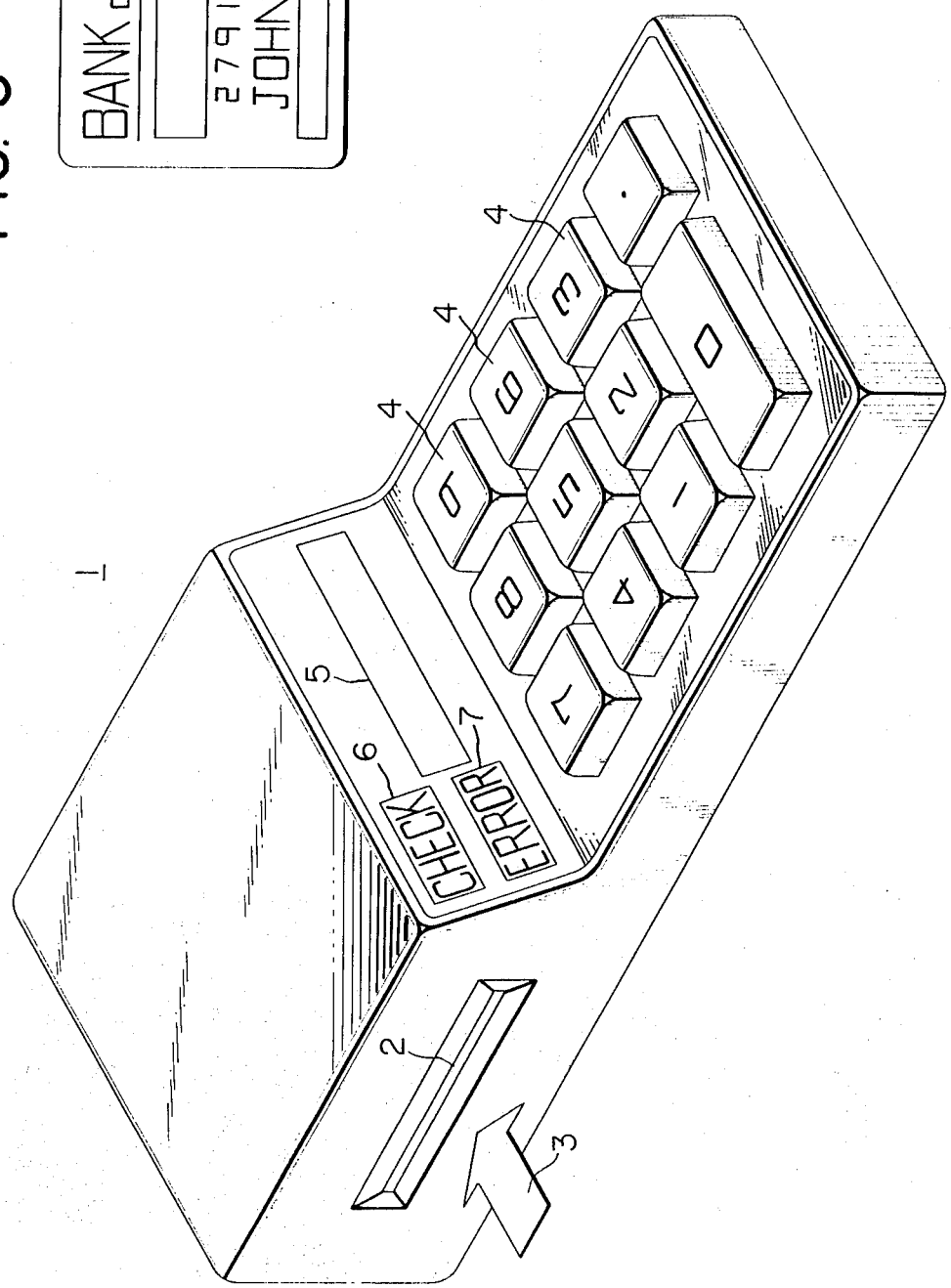
FIG. 1 shows a general appearance of the information recording device according to this invention.

Referring to FIG. 1, referential number 1 represents the body of the information recording device which, shown here, may be used as an independent unit or may be used as a part being incorporated in the card register, etc. Numeral 2 represents a card insertion port into which the operator will insert the card in the direction of arrow 3 according to the mark described on the card. Numeral 4 represents keyboard for feeding information signals; by pressing desired numerical keys, the information corresponding to said keys will be memorized temporatily by the shift register mentioned later and then magnetically written on the card. Numeral 5 is an indicator for indicating input information and may be made of Nixy tube, fluorescent indication tube, light-emitting diode, or liquid crystal, and by which the operator can push the keys with reference to said indication so that incorrect information will not be fed. Numerals 6 and 7 are indicators to indicate whether the written information signals are coincident with the read information signals, in which the characters of either "CHECK" or "ERROR" are displayed on the semitransparent covering by the burning of lamp installed therein. CHECK indication 6 will be displayed when the aforesaid two signals are coincided, and ERROR indication 7 will be displayed when the two signals are out of coincidence. The device of this embodiment is so constructed as to display both the coincident indication and the not-coincident indication. This construction is not absolutely necessary for the present invention, but if only one indication were made, other indication which should have been displayed might not often be displayed due to possible breakage in lines, resulting in incorrect collating. In view of such a possibility, by making the construction as in this embodiment, either one of indications is necessarily displayed, eliminating such a mistake. Also by making the covering of CHECK indication 6 in blue color and covering of ERROR indication in red color, the operator will be able to readily determine whether the writing is done correctly or not correctly by referring to the color illuminated, dispensing with reference to confirming the characters. It is of course possible that the characters are directly illuminated like the light-emitting diode and Nixy tube.

Figure 2:
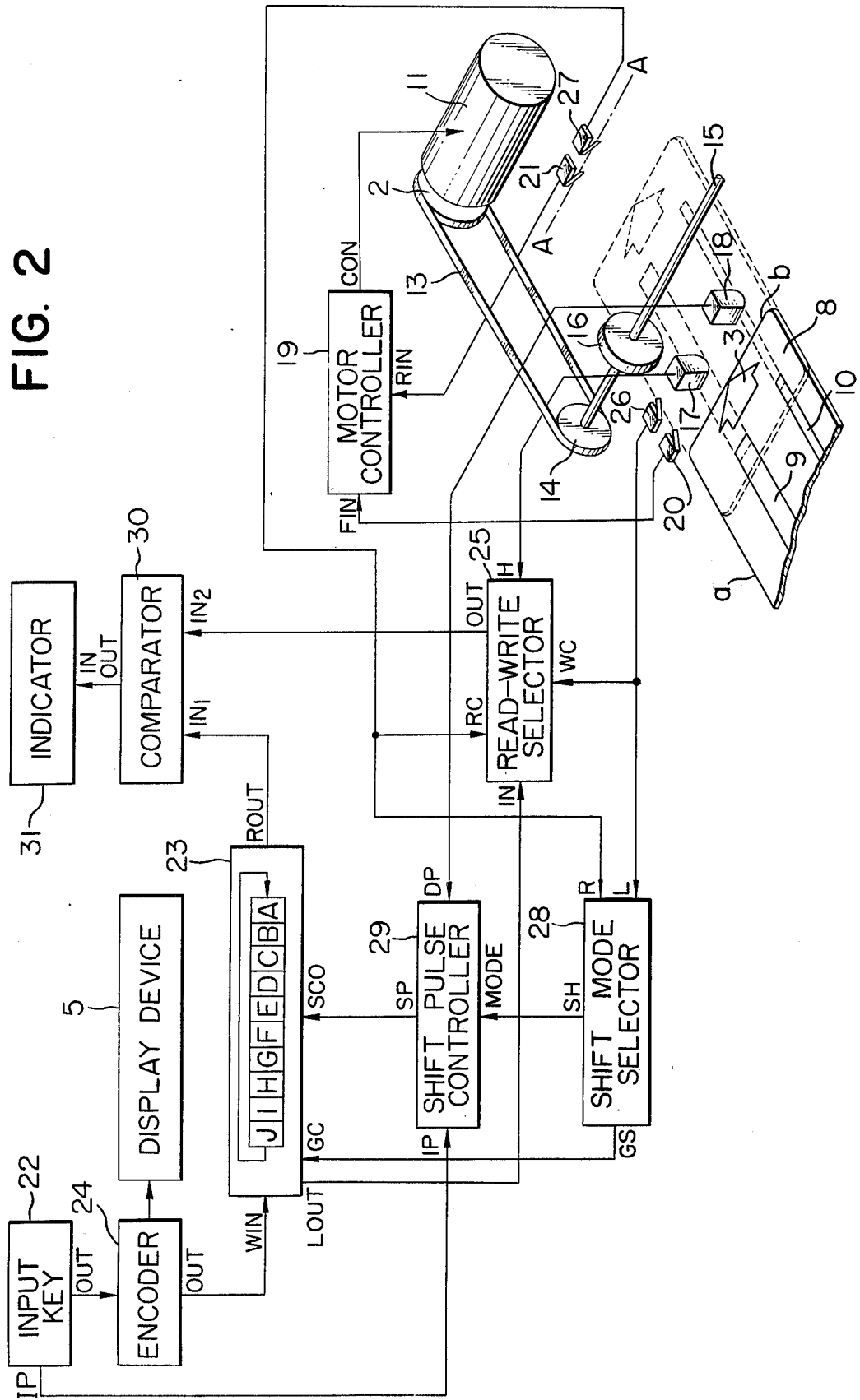
FIG. 2 shows an embodiment of the inner construction of the device according to this invention.

Referring to FIG. 2, the referential numeral 8 represents a magnetic card having information writing track 9 and timing track for obtaining time synchronism on writing or reading the information; 11 is a motor that reciprocates said magnetic card 8 through pulley 12, belt 13, pulley 14 and roller 16 fastened to said pulley 14 through shaft 15; 17 is a magnetic head that writes information on the writing track 9 or reads the information when said magnetic card 8 is being reciprocated; 18 is a magnetic head which recovers the synchronizing signals from the timing track 10 when said magnetic card 8 is being reciprocated; 19 is a motor controller which, when said magnetic card 8 is inserted in the direction of arrow 3, receives with its terminal FIN the output of microswitch 20 actuated by the edge a of said magnetic card 8 and produces rotation control signal from the terminal CON to said electric motor 11 to move the magnetic card 8 forward, and which, when said magnetic card 8 has finished forward movement, receives with its terminal RIN the output of the microswitch 21 actuated by the edge b of said magnetic card 8 and produces reverse rotation control signal from the terminal CON to said electric motor 11 to move said magnetic card 8 backward; 22 corresponds to the keyboard 4 of FIG. 1 and is an input means to introduce information that is to be written on the magnetic card 8; 23 is a circulation type shift register having terminal WIN that reads the information from said input means 22 in the coded form through the encoder 24, reading terminal ROUT that effects reading at the time of right-shift mode, reading terminal LOUT that effects reading at the time of left-shift mode, shift-pulse input terminal SCO that receives the input of shift pulse, and a gate control terminal GC that receives selection signals of gate at the time of input and output; 25 is a selector which selects the input-output paths at the time when the magnetic head 17 is writing or reading and which, when the terminal WC has received the output of the microswitch 26 actuated by the forward movement of the magnetic card 8 inserted along the arrow direction 3 being driven by the roller 16, sends the information signal received at the input terminal IN to the magnetic head 17 via terminal H to effect writing of information on the writing track of the magnetic card 8, and which, when the terminal RC has received the output of microswitch 27 actuated by the finish of the forward movement of the magnetic card 8, allows the magnetic head 17 to read information written on the magnetic card 8 and produces the read signal received from said magnetic head 17 via terminal H out of the output terminal OUT; 28 is a mode selector which receives the output of said microswitch 26 with the terminal L, receives the output of said microswitch 27 with the terminal R, selects the modes of right shift or left shift of the shift register 23, sends the selection signal of gate corresponding to each mode to the gate control terminal GC of said shift register via terminal GS, and produces the selection control signal of shift pulse corresponding to each mode from the output terminal SM; 29 is a pulse controller which receives the input synchronizing signal from the terminal IP of said input means 22 when the information is introduced from said input means 22 to said shift register 23, receives a synchronizing signal with its terminal DP from the timing track 10 of the magnetic card 8 via magnetic head 18 when the information to the magnetic card 8 is being written or being read and receives with its terminal MODE a selection control signal of each mode of right-shift or left-shift to give appropriate shift pulse to said shift register 23; 30 is a coincidence detector circuit which receives with terminal $IN_1$ the output from the terminal ROUT of the shift register 23, receives with terminal $IN_2$ the output from the terminal OUT of the selector 25, and produces a coincidence signal when the signals of both terminals are the same, and produces a non-coincidence signal from the terminal OUT when the signals of both terminals are different; 31 is an indicator which correspond to indicators 6 and 7 of FIG. 1, and makes indication according to the signals of coincidence or non-coincidence produced by said coincidence detector circuit 30, and burns a lamp (not shown) on the side of CHECK indication 6 in the case of coincidence and burns the lamp (not shown) on the side of ERROR indication 7 in the case of non-coincidence. Also, as for display means of collating, there may be provided a warning-sound producing means together with said indication means, or only the sound may be produced.

Figure 3:
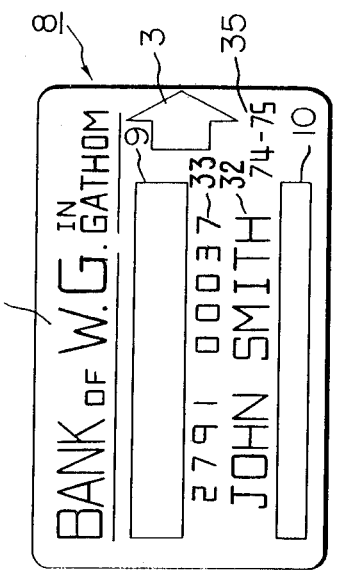
FIG. 3 is an example of the card applied to the device of this invention.

Magnetic card 8 is an oblong plastic board, for example, as shown in FIG. 3. Said magnetic card 8 is coated with magnetic films forming said information track 9 and timing track 10 and is embossed with numbers 33 specific to the individual such as name 32 or account number and valid term 35, and is further printed with the name of retail shop 34. The information track 9 is also written with special numbers which are different from the numbers embossed and are not intelligible for the third person. Further the cards used in card registers which operate "off line" are designed to be written with final balance after payment has been done (but in this case, the apparatus needs a calculation means to calculate the final balance). Synchronizing signals have been recorded on the timing signal track beforehand.

Operation of the setup constructed as mentioned above is illustrated below. Microswitchs 20, 21, 26 and 27 initially are not actuated. At this moment, the mode selector 28 produces from its terminal GS a gate control signal to the gate control terminal GC of the shift register 23 to select input terminal WIN, and produces from the terminal SM a signal that specifies the shift pulse as to right-shift to the terminal MODE of the shift pulse controller 29 in synchronism with the input synchronizing signal from the terminal IP of the input means 22. Under the abovementioned condition, if now the information input signals, A, B, C - - - J from the input means 22 are put through the encoder 24 and through terminal WIN to the shift register 23 by turn, the information signals A, B, C - - - J starting from the right as shown will be stored on said shift register 23. At this moment, the input information will be displayed on the input information indicator 5. Where the information signals stored on the shift register 23 are to be written on the magnetic card 8 through the aforesaid process, said magnetic card 8 should be inserted in the direction of arrow 3. The microswitch 20 at this moment is actuated, and the output signal is put into the terminal FIN of the motor controller 19, resulting in the production of a control signal from the terminal CON. The motor 11 then works to move said magnetic card 8 forward; said magnetic card 8 is sent in the direction of arrow by the roller 16. As said magnetic card 8 is moved, the microswitch 26 is actuated and the output signal is put into the terminal WC of the selector 25. Therefore, said selector 25 is so set as to transmit the input from terminal IN to terminal H, causing the magnetic head 17 to assume the state of writing. Also at the same time, the output signal of said microswitch 26 is put into the terminal L, of the mode selector 28, so that said mode selector 28 produces a signal that specifies the output from the terminal LOUT to the gate selection control terminal GC of the shift register 23, and also produces a signal that specifies the left-shift to the terminal DP of the shift pulse controller 29 in synchronism with the synchronizing signal read through the magnetic head 18 from the timing track 10 of the magnetic card 8. Said signal is applied from the terminal SP to the terminal SCO of the shift register 23, and information A–J stored on the shift register 23 is read out from the terminal LOUT in order of J, I, H - - - A and are written by turns on the magnetic card 8 which is moving forward through the magnetic head 17. The synchronizing signal being written on the card may depend on the signals fed from the external source in place of signals recorded in the timing track 10. Until the magnetic card 8 comes to actuate the microswitchs 21 and 27 through the aforementioned steps, the information signal A, B, - - - J fed from the input means will have been finished. Here, since the shift register 23 is of a circulation type, there is memorized the information A-J as before when writing to the magnetic card 8 has just finished. Next, when said magnetic card 8 reached the line A—A and the microswitches 21 and 27 are actuated, the output signal of said microswitch 21 causes the motor 11 to rotate in the reverse direction to move said magnetic card 8 backward; hence the magnetic card 8 is moved in the reverse direction by the roller 16. At the same time, the output signal of the microswitch 27 is fed to the terminal RC of the selector 25, and said selector 25 allows the magnetic head 17 to perform reading; the signal read from the writing track 9 of said magnetic card 8 is read via magnetic head 17 and fed to terminal H and then produced from terminal OUT. Also at the same time, the output signal of said microswitch 27 is fed to terminal R of the mode selector 28. The mode selector 28 then gives a signal that specifies the output from the terminal ROUT to the gate control terminal GC of the shift register 23, and gives a signal that specifies the right-shift to the terminal DP of the shift pulse controller 29 in synchronism with the synchronizing signal read from the timing track 10 of magnetic card 8 via magnetic head 18. Through the above-mentioned operation, the output signals A, B, C - - - J are produced by turns from the terminal ROUT of the shift register 23 and fed to terminal $IN_1$ of the coincidence detector means 30. But here the written information A, B - - - J are read out by turns via magnetic head 17 from the writing track 9 on which is written information of the magnetic card 8 which is moving in the direction opposite to that at the time when information is written in synchronism with the output of the output signals of said information A, B, C - - - J, and are fed to terminal $IN_2$ of said coincidence detector means 30. Here if the signals fed in turn from $IN_1$ and $IN_2$ of the coincidence circuit 30 are the same, said coincidence detector means 30 will produce coincidence output from the terminal OUT to indicate that both inputs are coincident; indication means will display a coincidence indication, i.e., CHECK indication 6. But if the inputs from both input terminals $IN_1$ and $IN_2$ are not coincident, said coincidence detector means 30 produces non-coincidence output from the terminal OUT to indicate non-coincidence; the indication means displays non-coincidence indication, i.e., ERROR indication 7. The operator will then be able to confirm that information was not written correctly on the magnetic card 8.

Whether information was written correctly on the magnetic card 8 or not is thus confirmed through the aforementioned steps, and the card is recovered. And at this moment, all microswitches 20, 21, 26 and 27 are liberated from the state of being actuated, and the system restores to the state where the magnetic card 8 is not yet inserted. Here if it is confirmed that the information was not written correctly onto the magnetic card 8, new magnetic card 8 or the magnetic card 8 of which writing track 9 being erased may again be inserted in the direction of arrow 3, to effect writing of information again.

Figure 4:
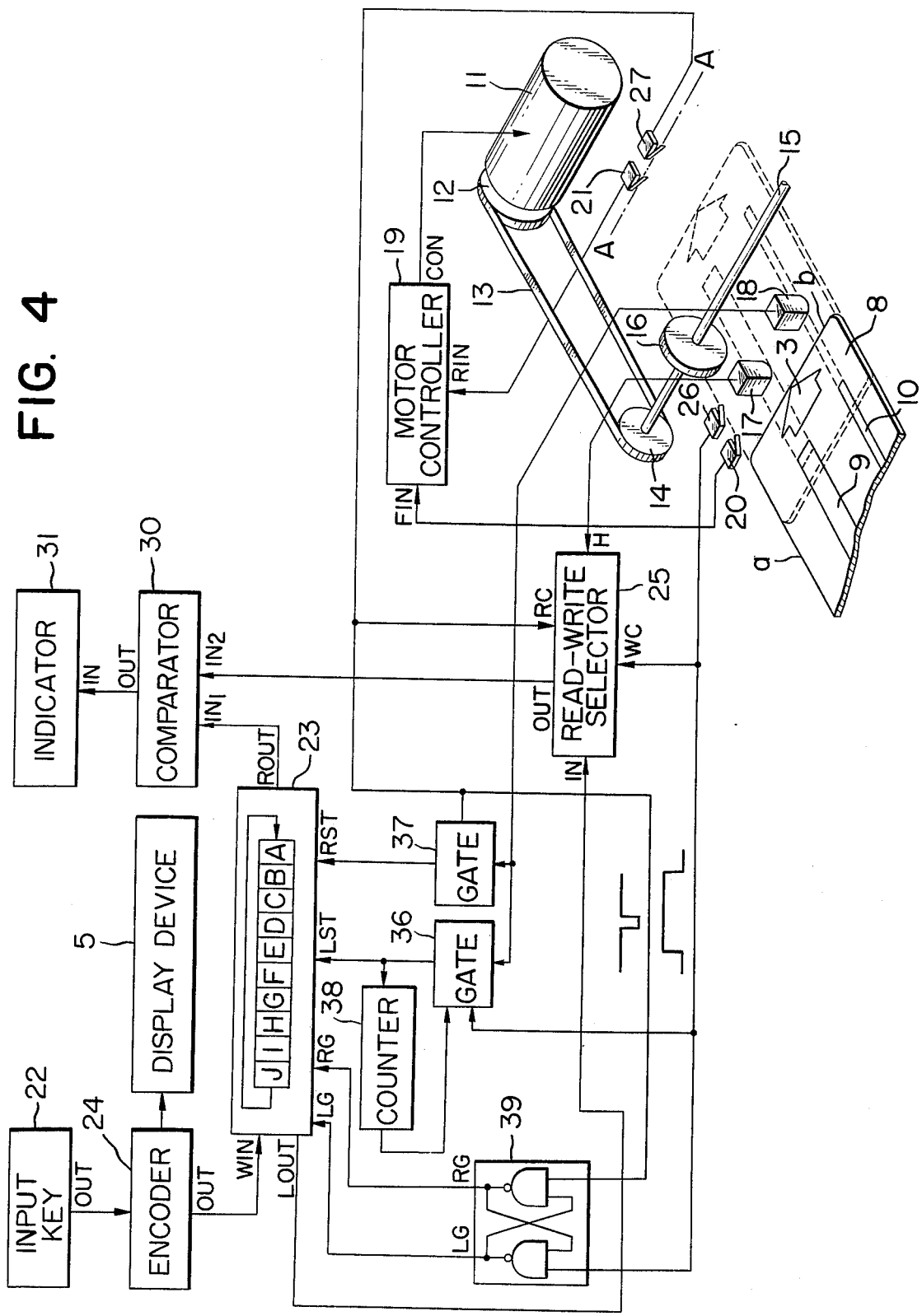
FIG. 4 shows another embodiment of the device of this invention.

The present invention can also be materialized in a manner shown in FIG. 4. Referring to FIG. 4, numerals 36 and 37 represent gates that give timing signals read by the magnetic head 18 to the shift register 23 upon receipt of the output signal from the microswitch 26. The shift register 23 performs left-shift operation by the signal of gate 36 and right-shift operation by the signal of gate 37. Numeral 38 represents a counter that commences counting from the moment the gate 36 has produced output, produces output signal as the capacity of the shift register 23, i.e., 10 is counted, and closes the gate 36. 39 is a flip-flop which, upon receipt of the output signal from microswitch 26, produces a high-level signal on the side of terminal LG (the terminal RG side at this moment is at a low-level) to allow reading of information from the terminal LOUT of the shift-register 23, and which, upon receipt of output signal from microswitch 27, produces a high-level signal on the side of terminal RG (the terminal LG side at this moment is at a low-level) to allow reading of information from the terminal ROUT.

Being constructed as mentioned above, the card 8 inserted causes the signal to be produced by the microswitch 26, and this signal causes the terminal LG side of the flip-flop 39 to assume a high-level. Also the gate 36 is opened to give the timing signal of left-shift to the shift register 23; information of said shift register 23 is read from the terminal LOUT and written on the card 8. At this moment the counter 38 counts the timing signal. As the reading of information is finished, the output signal is produced from the counter 38 to close the gate 36. Next as the card 8 reaches the position A—A to hit the microswitch 27, a signal is produced from said microswitch 27; said signal causes the terminal RG side of the flip-flop 39 to assume a high-level. The gate 37 is then opened to give a timing signal of right-shift to the shift register 23. Information of said shift register 23 is read from the terminal ROUT and fed to the coincidence detector circuit 30.

As mentioned above, this invention was devised in view of the fact that in general practice, on writing information on the card type information recording medium, the card is moved reciprocally, information is written during forward movement of the card, and the card is recovered after the backward movement, thus accompanied by dead time of backward movement. And according to this invention however, by reading the contents of information written on the card during backward movement of the card, the so read information is compared to the information contents initially written to confirm whether writing was done correctly or not, thus contributing to effective use of backward movement or time, making it possible to confirm written information with a very simple construction.

The above embodiments have dealt with the cases of writing the input information directly, but it should be understood that this invention is not limited to such embodiments only. The input information may be written after being processed appropriately. Processing means may comprise, in the case where the input information is of numerals, replacing the numerals by other numerals under a determined rule, or interchaning the order of numerals. Also there may be provided an operation function to operate the input information and to write the results. In the case of writing the input information by processing it, the information that is to be written finally should, of course, be memorized in the memory means.

Further, although the foregoing embodiments have dealt with the case of using a magnetic card as a card information recording medium, it should be noted that the card information system of this invention is applicable to any other card information recording media, such as bar, code card, mark card, punched card, etc., thus providing very wide utility.

We claim:

1. An information writing device comprising;
a roller which moves the card on which is to be written information;
a motor to drive said roller;
keyboard which feeds information input that is to be written on said card;
a shift register which memorizes the input information;
first switch which detects the initiation of forward movement of said card;
second switch which detects the finish of forward movement of said card;
a motor controller which causes said motor to rotate in the direction of forward movement of said card upon receipt of the output signal of said first switch and causes said motor to rotate in the direction of backward movement of said card upon receipt of the output signal of said second switch;
a mode selector which selects the shifting direction of information in said shift register responsive to the output signals of said first and second switches;
a read head which reads out the synchronizing signals recorded on said card;
a read-write head which writes information on said card and reads out information from said card;
a selector which selects the state of said read-write head depending on the output signals of said first and second switches;
means which applies said synchronizing signal to said shift register depending on the selection of said mode selector to produce information from said shift register;
means which collates the information read out by said read-write head with the information produced by said shift register; and
means which display the collating.

2. An information writing device according to claim 1, which is further comprising means to display input information.

3. An information writing device according to claim 1, wherein said collating display means has means for displaying coincidence as well as means for displaying non-coincidence.

4. An information writing device according to claim 1, wherein the display color of said coincidence display means is different from the display color of said non-coincidence display means.

5. An information writing device comprising;
means which reciprocates the card on which is to be written information;
means which feeds information input that is to be written on said card;
a shift register which memorizes the input information;
first means which detects the initiation of forward movement of said card;
second means which detects the finish of forward movement of said card;
a flip-flop which selects the information reading terminal of said shift register depending on the output signals of said first and second detecting means;
means which detects the synchronizing signals recorded on said card;
means which writes information on said card;
means which reads out information from said card;
a selector which selects writing information on said card or reading information depending on the output signals of said first and second detecting means;
a gate means which is opened and closed by the output signals of said first and second detecting means and give the synchronizing signals read from said card to said register;
means which collates the information read out by said reader means with the information produced from said shift register; and
means which display the collating.

6. An information writing device according to claim 5, which is further comprising means which controls said reciprocating means in such a manner that said card is moved forward by the output signal of said first detecting means and said card is moved backward by the output signal of said second detecting means.

7. An information writing device according to claim 5, which is further comprising means which displays input information.

8. An information writing device according to claim 5, wherein said collating display means has means for displaying coincidence as well as means for displaying non-coincidence.

9. An information writing device according to claim 8, wherein the display color of said coincidence means is different from the display color of said non-coincidence display means.

10. An information writing device comprising:
reciprocating means for reciprocating a card, on which is to be written information, along a card guide line;
memory means for storing information to be written on said card;
instructing means for detecting the card moving forward along said card guide line to instruct said memory means to provide the information being stored in the memory means;
writing means for writing the information extracted from said memory means on said card while said card is being moved forward along said card guide line by said reciprocating means;
reading out means for reading out the information having been written on the card by said writing means, while said card is being moved backwardly along said card guide line by said reciprocating means; and
collating means for collating the information read out by said reading out means with the information being stored in said memory means.

11. An information writing device according to claim 10, which is further comprising;
first means which detects initiation of forward movement of said card;
second means which detects finish of forward movement of said card; and
means which selects extracting direction of information from said memory means responsive to the output signal of said first and second detection means.

12. An information writing device according to claim 11, which is further comprising;
means which detects synchronizing signals recorded on said card; and
means which applies the synchronizing signals detected by said detection means to said memory means responsive to the selection of extracting direction of said extraction-direction selecting means.

13. An information writing device according to claim 12, which is further comprising;

means which selects either writing the information of said memory means on said card or reading out the information from said card to transmit it to said collating means, depending on the output signal from said first detecting means and output signal from said second detecting means.

14. An information writing device comprising:

means which reciprocates a card on which is to be written information;

a shift register in which information to be written on said card is stored;

input means which provides said shift register with information to be written on said card;

first means to detect the initiation of forward movement of said card;

second means which detects the finish of forward movement of said card;

a mode selector which selects the shifting direction of information in said shift register depending on the output signals of said first and second detecting means;

means which detects the synchronizing signal recorded on said card;

means which writes information on said card;

means which reads out information from said card;

a selector which selects writing information on said card or reading information depending on the output signals of said first and second detecting means;

means which applies said synchronizing signal to said shift register depending on the selection of said mode selector, in order to produce information from said shift register;

means which collates the information read out by said reading means with the information produced by said shift register; and means which displays the collating.

15. An information writing device according to claim 14, which is further comprising;

means which controls said reciprocating means in such a manner that the output signal from said first detecting means moves said card forward and the outpt signal of said second detecting means moves said card backward.

16. An information writing device according to claim 14, which is further comprising means to display input information.

17. An information writing device according to claim 14, wherein said collating display means has means for displaying coincidence as well as means for displaying non-coincidence.

18. An information writing device according to claim 17, wherein the display color of said coincidence displaying means is different from the display color of said non-coincidence displaying means.

* * * * *

UNITED STATES PATENT AND TRADEMARK OFFICE
CERTIFICATE OF CORRECTION

PATENT NO. : 3,946,202
DATED : March 23, 1976
INVENTOR(S) : TANIGUCHI, T. ET AL

It is certified that error appears in the above-identified patent and that said Letters Patent are hereby corrected as shown below:

At entry "]30]" on the identification page of the patent change the number of the Japanese Priority Document to read --48-109855--

Signed and Sealed this

Fourth Day of October 1977

[SEAL]

Attest:

RUTH C. MASON
Attesting Officer

LUTRELLE F. PARKER
Acting Commissioner of Patents and Trademarks